United States Patent
Gaha Tchamabe et al.

(10) Patent No.: US 10,545,811 B2
(45) Date of Patent: Jan. 28, 2020

(54) AUTOMATIC ROOT CAUSE ANALYSIS FOR WEB APPLICATIONS

(71) Applicant: International Business Machines Corporation, Armonk, NY (US)

(72) Inventors: Armelle Parfaite Gaha Tchamabe, Boeblingen (DE); Daniel Kaulen, Boeblingen (DE); Timo Kussmaul, Boeblingen (DE); Klaus Rindtorff, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 15/403,418

(22) Filed: Jan. 11, 2017

(65) Prior Publication Data

US 2018/0196707 A1   Jul. 12, 2018

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0775* (2013.01)

(58) Field of Classification Search
CPC .............. G06F 11/079; G06F 11/0775; G06F 11/0751; G06F 11/0709; G06F 21/10; H04L 41/0631; H04L 41/509; H04L 41/5041
USPC ........................................ 714/38.1
See application file for complete search history.

(56) References Cited

U.S. PATENT DOCUMENTS

| | | |
|---|---|---|
| 7,191,364 B2 | 3/2007 | Hudson et al. |
| 7,210,071 B2 | 4/2007 | Deacon et al. |
| 7,409,593 B2 | 8/2008 | Aaron |
| 7,489,639 B2 | 2/2009 | Breitgand et al. |
| 7,523,349 B2 | 4/2009 | Barras |

(Continued)

FOREIGN PATENT DOCUMENTS

WO   2015172657 A1   11/2015

OTHER PUBLICATIONS

Wikipedia "content management system" page from date 0110/2017, retrieved using the Way Back Machine from https://web.archive.org/web/20170110220605/https://en.wikipedia.org/wiki/Content_management_system (Year: 2017).*

(Continued)

*Primary Examiner* — Yair Leibovich
(74) *Attorney, Agent, or Firm* — William H. Hartwell; Madeline F. Schiesser; Keohane & D'Alessandro PLLC (57) ABSTRACT

A method for enabling a root cause analysis for an error originating in a content management system, is provided herein. The method comprises storing an identifier and a version number for each digital content item undergoing a change relating to the digital content item, and rendering a web page including the digital content item. The identifier and the version number are invisibly included in the web page. The method also comprises including the identifier and the version number in a request based on the rendered web page including the digital content item, storing fingerprint data relating to the request, creating an error record if during an execution of the request an execution error occurs, and making available the error record, the identifier and the version number of the related digital content item, as well as the related fingerprint data.

20 Claims, 5 Drawing Sheets

(56) References Cited

U.S. PATENT DOCUMENTS

| | | |
|---|---|---|
| 7,945,658 B1 | 5/2011 | Nucci et al. |
| 8,001,527 B1 | 8/2011 | Qureshi et al. |
| 8,266,279 B2 | 9/2012 | Marvasti |
| 8,302,079 B2 | 10/2012 | Bansal et al. |
| 8,407,170 B2 | 3/2013 | Harrison et al. |
| 8,655,623 B2 | 2/2014 | Duyanovich et al. |
| 8,839,188 B2 | 9/2014 | Chen et al. |
| 9,154,383 B2 | 10/2015 | Manuel-Devadoss et al. |
| 9,268,534 B1* | 2/2016 | Lopez ................... G06F 17/248 |
| 9,479,519 B1 | 10/2016 | Hill et al. |
| 10,176,033 B1* | 1/2019 | Wang .................... G06F 11/079 |
| 10,218,511 B2* | 2/2019 | Campagna ............ H04L 9/3247 |
| 2005/0096953 A1 | 5/2005 | Washington et al. |
| 2006/0165040 A1* | 7/2006 | Rathod .................. G06Q 10/10 370/335 |
| 2007/0067712 A1* | 3/2007 | Baker ................. G06F 17/3089 715/234 |
| 2008/0288821 A1 | 11/2008 | Aaron |
| 2009/0183030 A1 | 7/2009 | Bethke et al. |
| 2014/0149174 A1 | 5/2014 | Abbott et al. |
| 2014/0282670 A1* | 9/2014 | Sinha ..................... H04H 60/40 725/19 |
| 2015/0332147 A1 | 11/2015 | Anastas et al. |
| 2019/0190966 A1* | 6/2019 | Decoret ................ H04L 65/607 |

OTHER PUBLICATIONS

Elsaka et al., "Disqover: Debugging via Code Sequence Covers", IEEE, 2015, pp. 85-92.

* cited by examiner

| Exception | Timestamp (interval variable) | Fingerprint (categorical variables) | | | | | |
|---|---|---|---|---|---|---|---|
| | | web page id | content item id | content item version | request type | user id | role |
| NotAuthorizedException | 10/6/16 11:00 AM | 44 | 446 | 446-rev1 | CREATE | author001 | AUTHOR |
| NullPointerException | 12/6/16 11:00 AM | 55 | 897 | 897-rev9 | UPDATE | author002 | AUTHOR |
| NullPointerException | 13/6/16 12:00 AM | 66 | 456 | 456-rev6 | UPDATE | author003 | AUTHOR |
| NotAuthorizedException | 19/6/16 12:00 AM | 11 | 123 | 123-rev3 | VIEW | user001 | USER |
| NotAuthorizedException | 19/6/16 4:00 AM | 11 | 123 | 123-rev3 | VIEW | user002 | USER |
| NotAuthorizedException | 19/6/16 5:00 AM | 11 | 123 | 123-rev3 | VIEW | user003 | USER |
| NotAuthorizedException | 19/6/16 6:00 AM | 12 | 113 | 113-rev4 | UPDATE | user003 | AUTHOR |

AUTOMATIC ROOT CAUSE ANALYSIS FOR WEB APPLICATIONS

FIELD OF THE INVENTION

Embodiments of the present invention relate generally to root cause analysis, and more specifically, to enabling a root cause analysis for an error, occurring in a content management system. Embodiments of the present invention relate further to a related system for enabling a root cause analysis for an error, occurring in a content management system, and to a computer program product for the same.

BACKGROUND

A typical website, web portal, or content management system can integrate software components for authoring and publishing, as well as applications like search, e-commerce, and further client-side or server-side applications, and interfaces to backend systems.

SUMMARY

A method for enabling a root cause analysis for an error originating in a content management system is provided herein. The method comprises storing an identifier and a version number for each digital content item undergoing a change relating to the digital content item, and rendering a web page including the digital content item. The identifier and the version number are invisibly included in the web page. The method also comprises including the identifier and the version number in a request based on the rendered web page including the digital content item, storing fingerprint data associated with the request, creating an error record in the case that during an execution of the request an execution error occurs, and making available the error record, the identifier, the version number of the related digital content item, and the related fingerprint data.

According to one aspect of the present invention, a method for enabling a root cause analysis for an error originating in a content management system is provided. The content management system can be adapted for a creation and a change of a plurality of digital content items. The method can comprise storing an identifier and a version number for each digital content item undergoing a change associated with the digital content item, and rendering a web page comprising the digital content item. The identifier and the version number can invisibly be included in the web page.

Furthermore, the method can comprise including the identifier and the version number in a request based on the rendered web page comprising the digital content item, storing fingerprint data associated with the request, creating an error record when during an execution of the request an execution error occurs, wherein the error record comprises the identifier, the version number of the digital content item, and the related fingerprint data, and making the error record, the identifier, the version number of the related digital content item, and the related fingerprint data, available.

According to another aspect of the present invention, a system for enabling a root cause analysis for an error originating in a content management system is provided. Also here, the content management system can be adapted for a creation and a change of a plurality of digital content items. The system can comprise an authoring unit adapted for storing an identifier and a version number for each digital content item undergoing a change associated with the digital content item, a rendering engine adapted for rendering a web page comprising the digital content item, and a browser component adapted for including, by the analysis script, the identifier and the version number in a request based on the rendered web page comprising the digital content item. The identifier and the version number can invisibly be included in the web page.

The system can further comprise a storage unit adapted for storing fingerprint data associated with the request, a creation module adapted for creating an error record in the case that during an execution of the request an execution error occurs and an access unit adapted for making the error record, the identifier, the version number of the related digital content item, and the related fingerprint data, available. The error record can comprise the identifier, the version number of the digital content item, and the related fingerprint data. It should be noted that the identifier and the version number can be combined to a single combined identifier.

Furthermore, embodiments can take the form of a related computer program product, accessible from a computer-usable or computer-readable hardware storage device providing program code for use, by or in connection with a computer or any instruction execution system. For the purpose of this description, a computer-usable or computer-readable hardware storage device can be any apparatus that can contain means for storing, communicating, or transporting the program for use by or in connection with the instruction execution system, apparatus, or device.

BRIEF DESCRIPTION OF THE DRAWINGS

It should be understood that embodiments of the present invention are described with reference to different subject matters. In particular, some embodiments are described with reference to methods, whereas other embodiments have been described with reference to apparatuses. However, a person skilled in the art will gather from the above and the following description that, unless otherwise stated, in addition to any combination of features belonging to one type of subject matter, also any combination between features relating to different subject matters, in particular, between features of the methods and features of the apparatuses, is considered as to be disclosed within this document.

Aspects defined above and further aspects of embodiments of the present invention are apparent from example embodiments described hereinafter and are explained with reference to the example embodiments, but to which embodiments of the present invention are not limited.

Embodiments of the present invention will be described, by way of example only, and with reference to the following drawings.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

In the context of this description, the following conventions, terms and/or expressions may be used.

The term 'root cause analysis' denotes a method of problem solving used for identifying the root causes of faults or problems. A factor can be considered a root cause if removal thereof from the problem-fault-sequence prevents the final undesirable event from recurring, whereas a causal factor is one that affects an event's outcome, but is not a root cause. Though removing a causal factor may benefit an outcome, the removal does not prevent recurrence of the undesirable event with certainty.

The term 'content management system' (CMS) denotes a system enabling content management (CM), which can be a set of processes and technologies that supports the collection, managing, and publishing of information in any form or medium. When stored and accessed via computers, this information can be more specifically referred to as digital content, or simply as content. A digital content item can take the form of text (such as electronic documents), multimedia files (such as audio or video files), or any other file type that follows a content lifecycle requiring management. The process is complex enough to manage that several large and small software vendors support systems to control and automate significant aspects of the content lifecycle.

The term 'digital content item' denotes a base element or a compound element of digital content. It can comprise text, sound, video, or related content to be made accessible to users. A content item can also include rules for the visualization of the digital content as well as interdependencies between individual content items.

The term 'fingerprint data' denotes a set of data, identifying environmental data of a request (e.g., from a browser) to one or more digital content items as part of a request. The fingerprint data can be identifiable by the identifier and the version number of a related content item, or a combined label of the two. The fingerprint data might, in particular, comprise the content identifier, the content version number, a web page identifier, a web page version number, the type of request, a selected dialog language, a locale, a user identifier, a role relating to the user identifier, and a permission relating to the user identifier. The fingerprint data can be extended by any additionally relevant data which may prove to be valuable for a root cause analysis (e.g., a web server type and version, operating system type and version, and so on).

The term 'error record' denotes a set of data allowing a solid retracement or simulation of an error which has occurred. The error record can comprise at least the identifier and the version number of the digital content item as well as the related fingerprint data.

The term 'locale' denotes a local or a specific language setting (e.g., German language versus German/Swiss language versus German/Austrian language).

The term 'distance vector' denotes a vector of data values indicative of a semantic distance multiplied with a predetermined weight factor for individual distance attribute values. This way, different algorithms for comparing attributes of the fingerprint can be implemented.

The term 'cognitive classification' denotes a method used in cognitive systems which represents a broader shift in computing, from a programmatic to a probabilistic approach, called cognitive computing. A cognitive system can make a new class of complex decision support problems computable, where the general context is ambiguous, multi-faceted, and fast-evolving. What to do in such a situation is usually assessed today by the business or technical user. A cognitive system can be designed to synthesize a complex error situation context and link the synthesized context to the root cause. The cognitive system recommends evidence-based actions to help the developer avoid potentially erroneous content items. The cognitive system does so by finding past situations similar to the current situation, and extracting the repeated actions that best influence the desired outcome.

The term 'div tag' defines a division or a section in a HTML (HyperText Markup Language) document. The <div> tag is used to group block-elements to format them with, for instance, cascaded style sheets (CSS). The <div> tag belongs to the nonvisible content of a web page.

The term 'analysis script' denotes a Javascript-based code segment embedded in the web page adapted to include the identifier number and a version number of the content item to a request generated based on the content item.

As discussed above, a website, web portal, or content management system can integrate software components for authoring and publishing, as well as applications such as search and e-commerce, client-side or server-side applications, and interfaces to backend systems. These are often implemented as a micro-services architecture and/or as running in a cloud computing environment. Fast and effective error detection and correction is crucial for live production systems, but is non-trivial due to the distributed nature of the architecture and the large number of requests. Root cause analysis is especially challenging when, for example, finding the high-level root cause of an error which shows low-level symptoms (e.g., exception in the log or an error response code of a micro service response).

As an example, consider the following scenario: A website provides user group specific content (e.g., for professionals and managers). An author creates a new picture that, when clicked by a user, links to a manager information system, which can be used by managers only. The content author may forget to also create a personalization rule which makes this picture available for managers only. The author stores the content update and publishes the content update to the content server. Later, during runtime, due to this error, non-manager users may see the picture and may click the picture. This sends a request to the manager information system (e.g., implemented as a separate micro-service), which then creates a low-level non-authorized exception. The exception is logged in the application log files. The error may be noticed by an end-user who complains, or by an operator who uses a log monitoring tool.

Now the operator needs to manually debug the root cause. Typically, it is costly to deduce the root cause (i.e., the particular content modification) from the low-level error codes. This may require debugging on the level of (micro-service) request traces, database entries, and HTML files. In the current art, there is no support in connecting the low-level exception to the high-level content update (e.g., creating a picture), enabling a fast identification of the source of such an error.

However, the method for enabling a root cause analysis for an error originating in a content management system of embodiments of the present invention can offer multiple advantages and technical effects.

A root cause analysis of an error in content items in a content management system can be identified and corrected much more easily as compared to traditional approaches. All required information and error logs are presented automatically to the developer and/or creator of the potentially erroneous content item. In case of an error, the fingerprint information can be used for identifying the author and the content that is involved, and that way enable a connection of the low-level error cause to a high-level content management operation. This can ease the process of finding wrong behaving content items and make the process of error identification cheaper and faster.

This can also work in a distributed computing environment, in which a plurality of micro-services is not delivered from one central system but from distributed source servers. Because of the forwarding of the fingerprint information to the distributed micro-services, the chain of requests and sub-requests can be followed in order to isolate the original program, statement, rule, or content item.

The developer of the content item can automatically be informed about a root cause for an error based on his content item development or changes to a content item. Furthermore, automatic rules can be derived from a plurality of such errors in order to support the development and change process of content items for avoiding execution of potentially erroneous content items before they can be released into a production system.

Additionally, advanced technologies, like cognitive computing and/or text mining can be integrated into embodiments of the present invention in order to identify programmatic content items which may cause an error in the future in and up to that stage (i.e., a development stage) in an unknown execution environment.

Thus, the technology can be extended to incorporate predictive error prevention or, in other words, functionality which allows actively preventing errors by warning users about harmful changes. This can reduce the error rate of the overall system and thus increase the reliability and the quality of service of the system. This functionality also reduces the cost and effort of debugging and fixing errors.

According to one embodiment of a method of the present invention, the fingerprint data can comprise the content identifier, the content version number, a web page identifier, a web page version number, the type of request, a selected dialog language, a locale, a user identifier, a role relating to the user identifier, and/or a permission relating to the user identifier. The request can comprise the options "create", "update", "view," and "delete". The request can, for example, be directed to a database, so that the request can initiate creating, deleting, modifying, or viewing a database element. The user identifier can be indicative of a descriptor, identifying a user and executing a related browser. The user identifier can also, and/or additionally, be a tenant ID (identifier) of a cloud computing service. The above-mentioned attributes can be instrumental in allowing a developer to identify an error that may occur during an execution of a web page in a browser or comparable program function.

According to one embodiment, the method can also comprise passing on the fingerprint data of the request to services receiving sub-requests of the request. The request can be sub-divided into sub-requests, asking for services from other servers which may not be directly available in the CMS and which can be generated on demand. Also in this case, potential errors in a chain of requests can be identified because there are not any missing links in the fingerprint data. Also in the case that the main request pulls together content items from different sources, the fingerprint data can be forwarded together with the sub-requests.

According to a further embodiment, the method can further comprise determining a common subset of attributes values of the error record and earlier stored error records, and relating the error record to earlier stored error records in the case that a predefined number of attribute values are identical between the error record and the earlier stored error records. This can allow a cross-correlation of errors which may have happened earlier. The new error may have the same reason as the errors having occurred at an earlier point in time. This can give a developer an important hint about a common reason for a mistake in the development of the content items.

According to a permissive embodiment, the method can comprise sending an alert to a developer account, relating to the digital content item having caused the creating of the error record. This can guarantee a fast recovery and error correction.

According to one additional embodiment of the method, making the error record available (e.g., to a developer) can also comprise making the identifier and the version number of the digital content item as well, as the fingerprint data available of the earlier stored error records, available. This can allow the developer a direct comparison of potentially responsible attributes. He may not be forced to pull the potentially relevant data together manually. All data required can be just at hand.

According to one further embodiment, the method can also comprise deactivating a digital content item having caused the creation of the error records, and activating the digital content item having the same identifier and an earlier (e.g., a previous) version number. Such a process can represent an automatic healing or repair of an erroneous content item. Only the first user in which session the error may occur may see the erroneous system behavior. Subsequent users may again work with the earlier version of the content item not causing the error.

According to another embodiment, the method can additionally comprise generating hypothetical fingerprint data for a digital content item undergoing a current change, comparing the hypothetical fingerprint data with a database of fingerprint data relating to error records, and generating a warning message for the current change if a predefined number of attribute values of the hypothetical fingerprint data and one of the fingerprint data of the database match. The generating hypothetical fingerprint data for a digital content item can also comprise generating a plurality of different versions of hypothetical fingerprint data, simulating different dynamic request variables of an execution environment. Thus, a developer may get a hint even at the development stage that his change to a content item may cause an error in live-system. Thus, the method and system of embodiments of the present invention can have a predictive element avoiding errors in the development stage of content items, and eliminating potential errors before they may be introduced to a system.

According to one additional embodiment, the method can also comprise comparing the hypothetical fingerprint data of the current change with fingerprint data of error records by calculating a distance vector—in particular based on text mining techniques—and/or performing a cognitive classification for attribute values of each hypothetical fingerprint data set and fingerprint data from the error records, resulting in one or more comparison results, and making the comparison results available for review; in particular by a development user as part of the development/change process. This way, the developer can receive proposals for avoiding potential runtime problems or significant future errors, if, for instance, the distance vector value exceeds a predefined threshold value.

According to one further embodiment, the method can also comprise deriving at least one rule—or in general a plurality of rules—based on the distance vector and/or the cognitive classification of comparing earlier error records. These results and rules can also be used as warnings during changes to the digital content item. This can be less resource intensive and more straightforward than performing cognitive classification and calculating a distance vector online. The rules can simply be used as a straightforward warning mechanism for the developer. In the following, a detailed description of the figures will be given. All instructions in the figures are schematic. A block diagram of an embodiment of the inventive method for enabling a root cause analysis for an error originating in a content management system is given. Afterwards, further embodiments, as well as embodiments of the system for enabling a root cause analysis for an error originating in a content management system, will be described.

Figure 1:
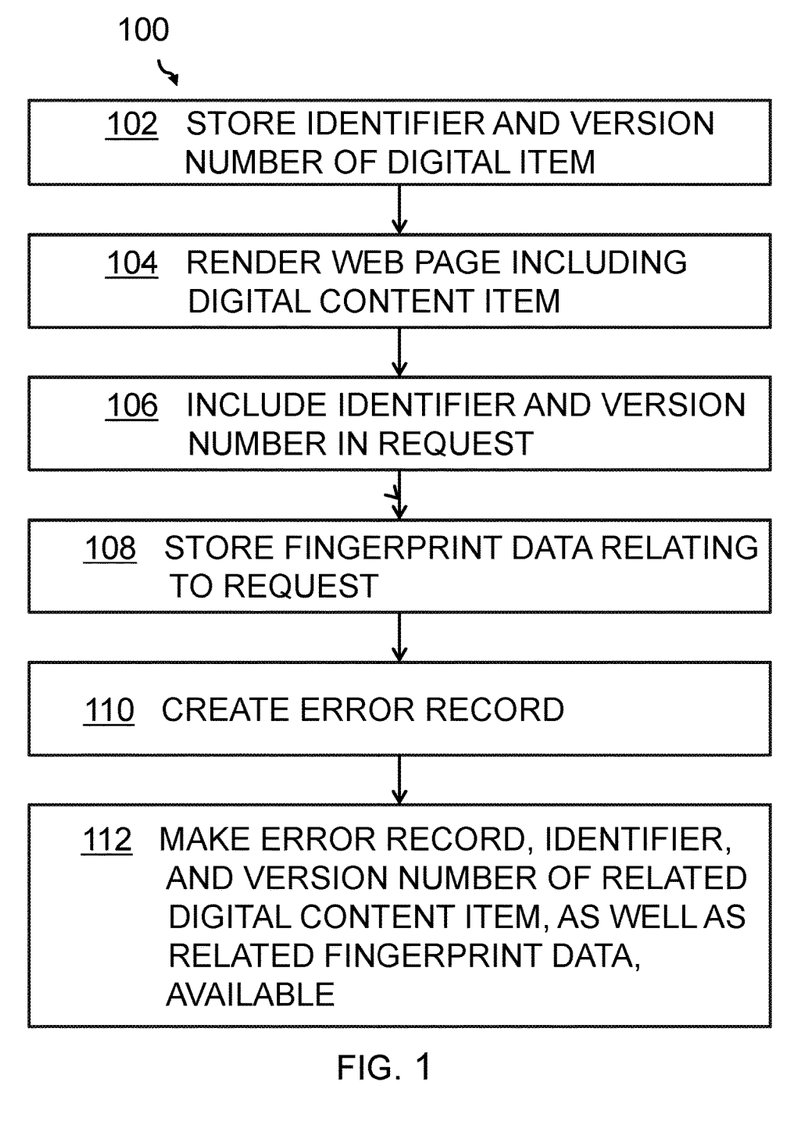
FIG. 1 shows a block diagram of a method for enabling a root cause analysis for an error originating in a content management system according to illustrative embodiments of the present invention.

FIG. 1 shows a block diagram of an embodiment of the computer-implemented method 100 for enabling a root cause analysis for an error originating in a content management system. The content management system is adapted for a creation and a change of a plurality of digital content items. The content can also comprise dependency rules between content items or sequence rules of different content items. Each content item can be a single element comprising text, a picture/an image, a sound clip, a video sequence, or a combination of more of one of the mentioned elements. The method comprises storing, 102, an identifier and a version number for each digital content item undergoing a change. A combined identifier can be used for the identifier and a version number of the content item. A skilled person also understands that a change can be a generalized expression also comprising creating, deleting, or modifying a content item. The change to the content item can be performed by using a content editor or authoring component of the underlying CMS.

The method also comprises rendering, 104, a web page including the digital content item. The identifier and the version number are invisibly included in the web page. This can, for instance, be done using a div tag expression of HTML. For practical reasons, an analysis script is also included in the web page (e.g., by the rendering engine).

Furthermore, the method comprises including, 106, by the analysis script, the identifier and the version number in a request based on the rendered web page including the digital content item. This can be performed by the browser used to display the content item. Then, the method comprises storing, 108, fingerprint data relating to the request. The fingerprint data can be stored by/in the CMS the request is directed to. The request can be directed to another item or a database query or update. Also included in the method is the step of creating, 110, an error record if during an execution of the request (i.e., web page request), an execution error occurs, wherein the error record comprises the identifier and the version number of the digital content item, as well as the related fingerprint data and the step of making, 112, the error record, the identifier and the version number of the related digital content item as well as the related fingerprint data available. These can be made available to an analysis tool and/or the developer for further analysis, in particular a root cause analysis for errors which happened at execution time. It should be understood that the identifier and the version number can be a direct component of the fingerprints data.

Figure 2:
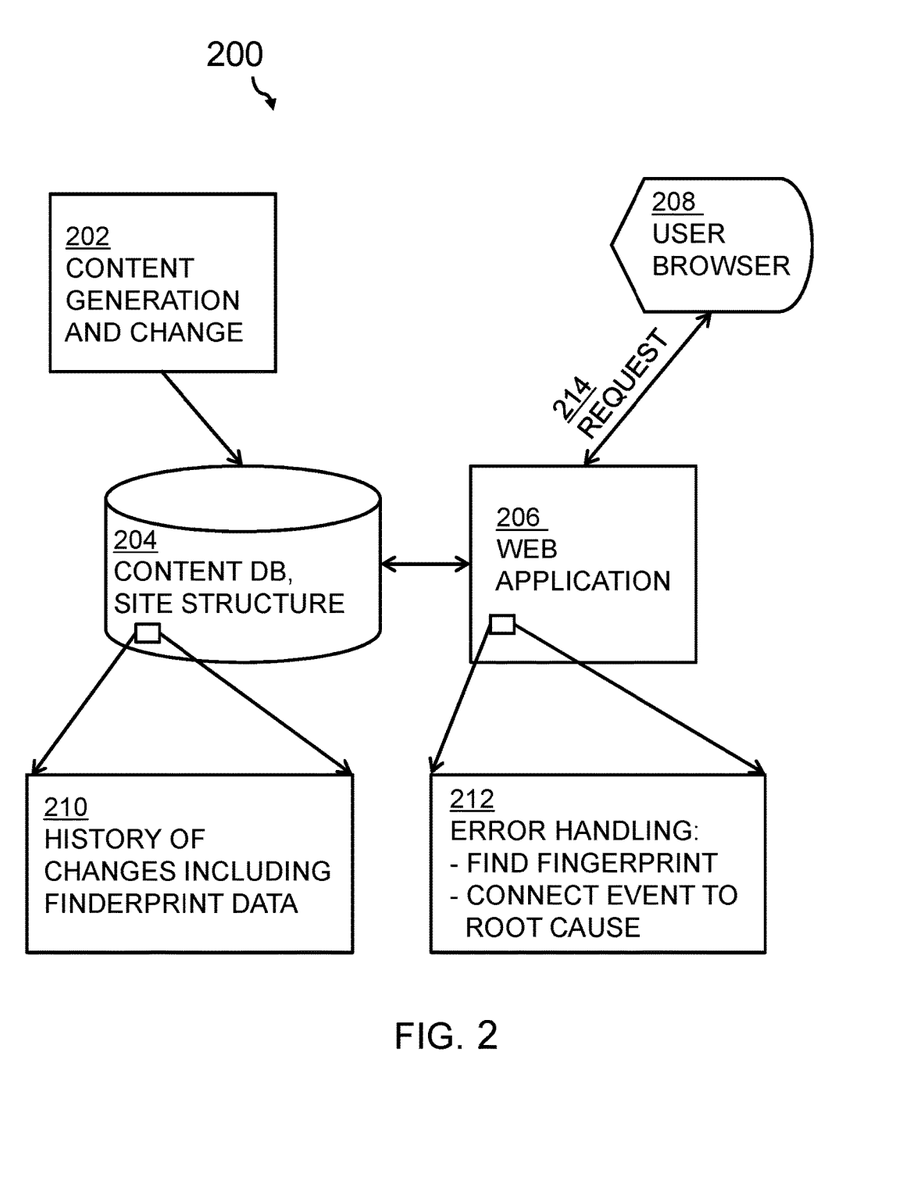
FIG. 2 shows a block diagram of core elements according to illustrative embodiments of the present invention.

FIG. 2 shows a block diagram 200 of core elements involved in embodiments of the present invention. The digital content item can be created, generated, or changed using an authoring tool 202. The content can be stored in a content database 204 which can also comprise the site structure. Typically, the content item can then be provided to a browser 208 by a web application 206 (e.g., a web server). Part of the content database 204 is the history of changes 210 (i.e., version number and actually produced changes) including the fingerprint data.

In case an error occurs during a request 214 from the user's web browser 208 during execution of the web application 206, an error handling function 212 is triggered. This triggering comprises at least finding the related fingerprint of the content item, having caused the execution error and logically connect the event of the execution error to the root cause of the execution error (i.e., to relevant data required to perform a root cause analysis).

In other words, the functionality of the root cause analysis method 100 and system of embodiments of the present invention can be described as follows. The functionality supports automatic root cause analysis in a web application. The application automatically identifies erroneous content which causes errors during content delivery or during processing of user interactions. The method and system notify content authors about errors and visualize the erroneous content in the content-authoring user interface. This can make error handling in an application less expensive and more effective, since it automates the task to link low-level error information to high-level activities, and thus helps to find the right person to fix an error and also supports this person via notification and visualization. The functionality for the improvement of a web application is comprised by the steps described below.

The content-authoring software component manages content item identifiers and version identifiers, and saves the version history of content items persistently. The content-authoring software component modifies the content item by inserting the content item identifier and version number (e.g., in a HTML div tag), which will not be visible in a browser. The content delivery software component modifies content pages by inserting web analytics scripts or hook points into content items (i.e., content pages). When an end-user interacts with a content item (e.g., clicks a link or clicks a picture) in the browser, a web analytics script determines the identifier and the version number of the content item and modifies the outgoing request to include this information. The content hub (e.g., the API (application programming interface) gateway software component) receives the request and creates fingerprint data of the request context.

This fingerprint data comprises a representation of the computing context when the error occurs and comprises data (e.g., identifier of the web page and related version, content item identifier and related version, a type of request, etc.), as described above. During request processing, this fingerprint record is passed on between different services and/or microservices, and can be updated with additional data. In case an error occurs in any software component while handling a user request, the error is logged, including the fingerprint data, and the content hub invokes the new root cause analysis component. The root cause analysis component can keep the history and statistics of all errors from the web application for further reference.

In an embodiment, the analysis includes the following steps: for each (significant) error, determining the associated fingerprints (e.g., five fingerprint data sets are associated with a NotAuthorizedException in the sample database); determining the subset of attributes of these fingerprints with the largest number of matching values (e.g., three out of five fingerprints have the same web page identifier, content item identifier, content item revision, request type, and user role); and passing this information to the appropriate software component (e.g., invoking the content authoring software component that can use this data to identify the responsible authors). The analysis can also include performing statistical analysis of recent errors and thus detecting statistically significant errors (e.g., a peak of errors which are related to certain content items). These can be used as weights for the comparison. For each (significant) error, the analysis determines the content item identifier and content item version from the fingerprint data that is associated with the error. The root cause analysis component invokes the content-authoring component, passing at least the content item identifier and version. The content-authoring component determines the list of content authors responsible for the given content item version and selects a set of authors to be notified (normally, the responsible author plus optional other authors and/or reviewers).

The content author user interface visualizes (e.g., highlights) details of the problematic content item version. Thus, the content author is able to quickly correct the error. The same is possible the other way around: during authoring of new content, the fingerprint (or a plurality of fingerprints) of a proposed change is taken and compared against historical fingerprint data from errors. In case a close match is found, the author can receive a notification about the potential risk of the proposed change.

As a further extension of the basic approach, a cognitive system that can detect content-authoring patterns or anti-patterns can be added to further improve the information available in case of an error. The cognitive system uses machine learning to learn from the set of formal representation of content modifications and the feedback (in particular, the error information including the fingerprint information) from their use. The content-authoring component monitors the actions of content authors and issues a warning in case an already known (learned) anti-pattern behavior is detected. Thus typical errors can be avoided.

Figure 3:
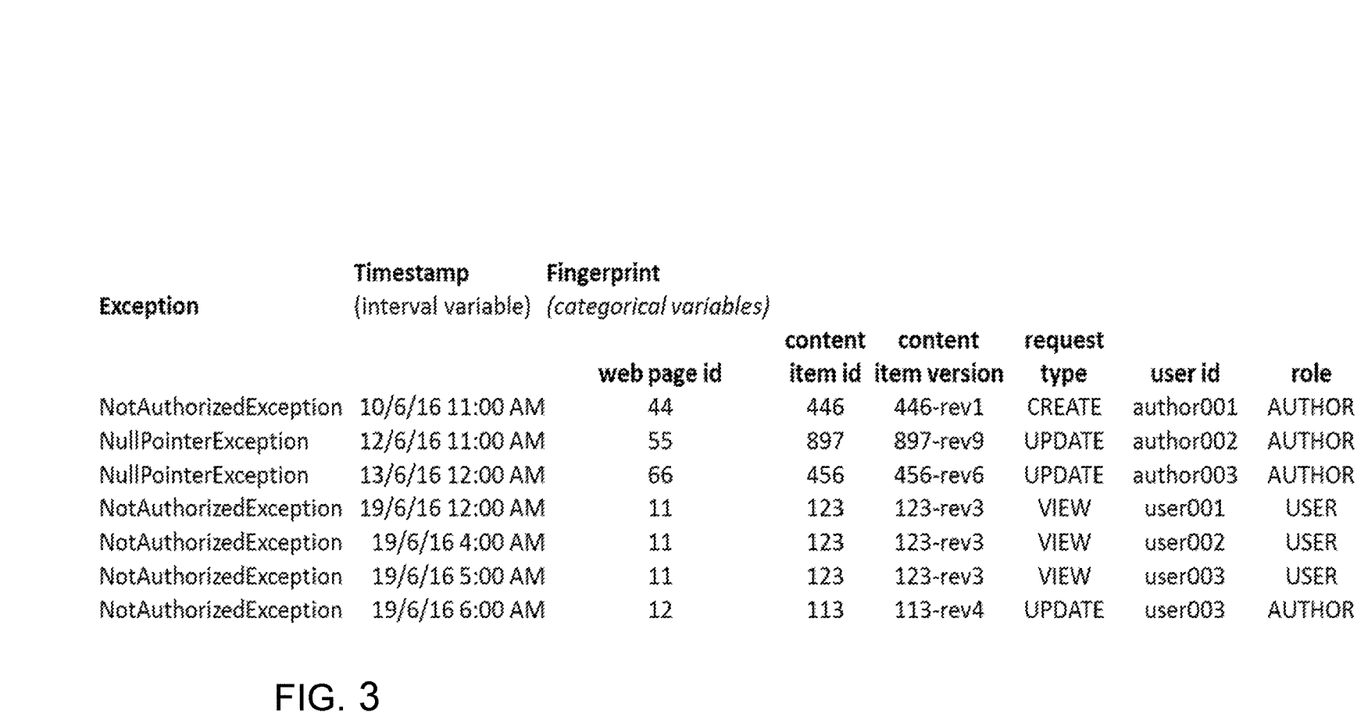
FIG. 3 shows an extract of a sample error database according to illustrative embodiments of the present invention.

FIG. 3 shows an extract of a sample error database with data about the exception that happened during execution of a request, a timestamp, the fingerprint data, the web page ID, the content item ID, the content item version, the request type, the user ID, and the user role. To a skilled person, the variable values are self-explanatory.

Figure 4:
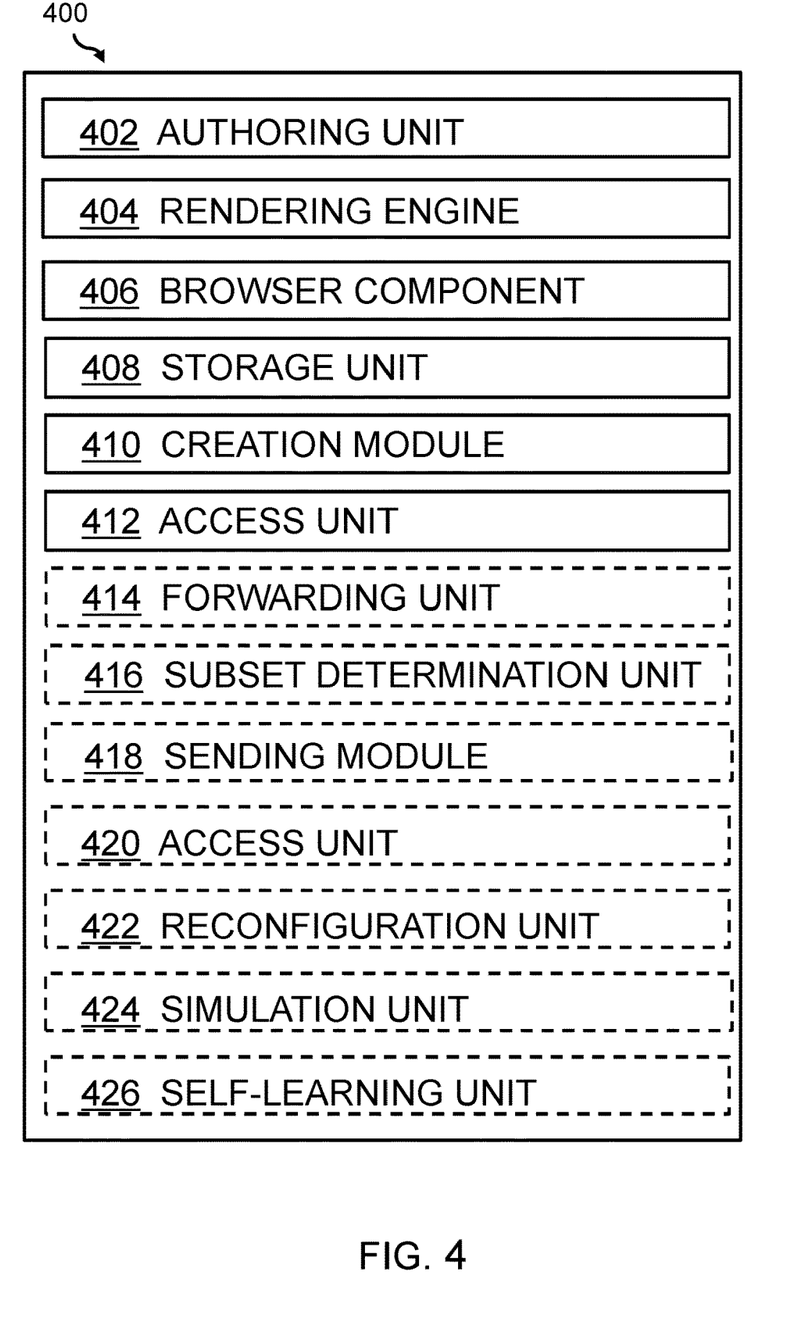
FIG. 4 shows a block diagram for enabling a root cause analysis for an error originating in a content management system, according to illustrative embodiments of the present invention.

FIG. 4 shows—for completeness reasons—a block diagram of an embodiment of a system 400 for enabling a root cause analysis for an error originating in a content management system. Again, the content management system is adapted for a creation and a change of a plurality of digital content items. The system 400 comprises an authoring unit 402 adapted for storing an identifier and a version number for each digital content item undergoing a change relating to the digital content item and a rendering engine 404 adapted for rendering a web page including the digital content item. The identifier and the version number are invisibly included in the web page and the analysis script is also included in the web page (e.g., by the rendering engine).

The system 400 further comprises a browser component 406 adapted for including, by the analysis script, the identifier and the version number in a request based on the rendered web page including the digital content item, a storage unit 408 adapted for storing fingerprint data relating to the request, and a creation module 410 adapted for creating an error record if during an execution of the request an execution error occurs, wherein the error record comprises the identifier and the version number of the digital content item, as well as the related fingerprint data. Further, the system 400 comprises an access unit 412 adapted for making the error record, the identifier, and the version number of the related digital content item, as well as the related fingerprint data, available.

Furthermore, and optionally, the system 400 can comprise, as shown in dashed lines in FIG. 4, a forwarding unit 414, a subset determination unit 416, a sending module, 418, an access unit 420, a reconfiguration unit 422, a simulation unit 424 and a self-learning unit 426, as characterized by the dependent claims to the system 400.

Figure 5:
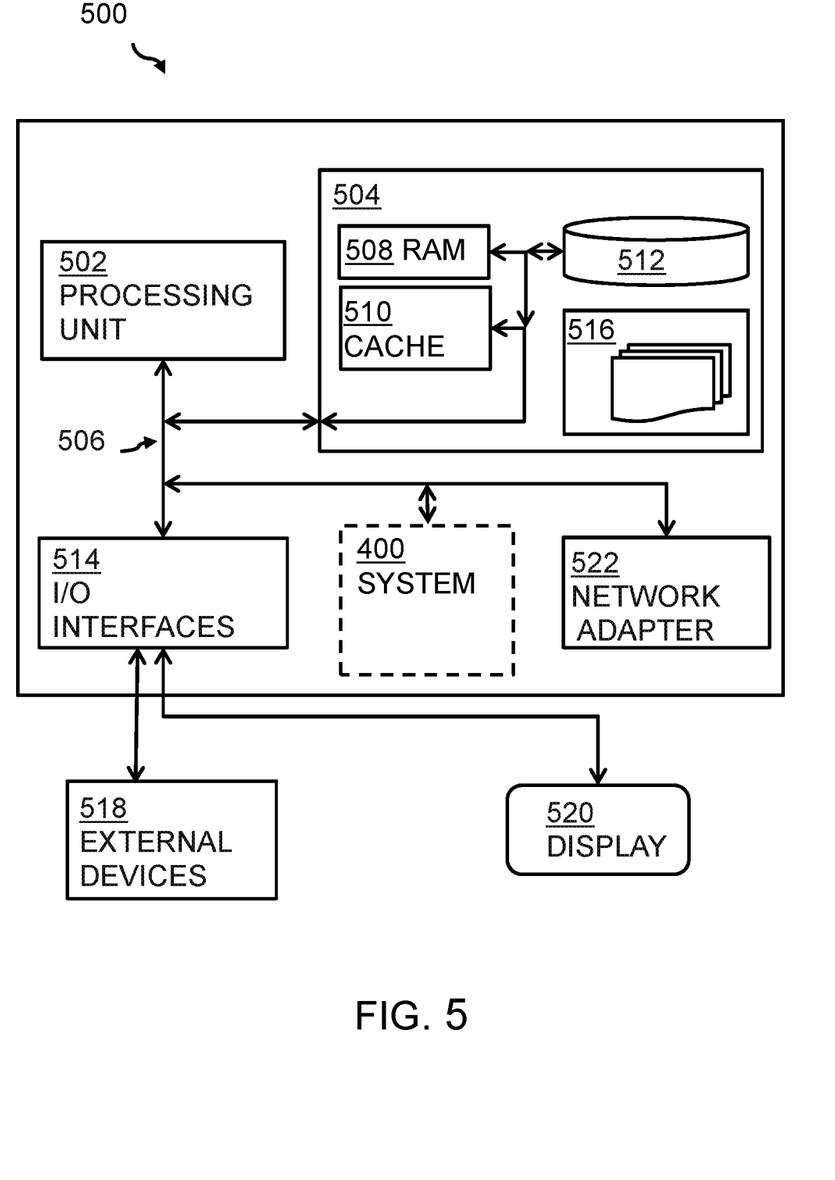
FIG. 5 shows a computing system for enabling a root cause analysis according to illustrative embodiments of the present invention.

Embodiments of the present invention can be implemented together with virtually any type of computer, regardless of the platform being suitable for storing and/or executing program code. FIG. 5 shows, as an example, a computing system suitable for executing program code related to the methods of embodiments of the present invention.

The computing system 500 is only one example of a suitable computer system and is not intended to suggest any limitation as to the scope of use or functionality of embodiments of the present invention described herein. Regardless, computer system 500 is capable of being implemented and/or performing any of the functionality set forth hereinabove.

In the computer system 500, there are components that are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 500 can be described in the general context of computer system-executable instructions, such as program modules, being executed by a computer system 500. Generally, program modules can include routines, programs, objects, components, logic, data structures, and so on that perform particular tasks or implement particular abstract data types. Computer system/server 500 can be practiced in distributed cloud computing environments where tasks are performed by remote processing devices that are linked through a communications network. In a distributed cloud computing environment, program modules can be located in both local and remote computer system storage media including memory storage devices.

As further shown in FIG. 5, computer system/server 500 is shown in the form of a general-purpose computing device. The components of computer system/server 500 can include, but are not limited to, one or more processors or processing units 502, a system memory 504, and a bus 506 that couples various system components including system memory 504 to the processor 502.

Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 502 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 502 collects and routes signals representing inputs and outputs between external devices 518 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 502 executes computer program code, such as program code for enabling a root cause analysis for an error originating in a content management system, which is stored in memory 504, storage system 512, and/or program/utility 516. While executing computer program code, processing unit 502 can read and/or write data to/from memory 504, storage system 512, and program/utility 516.

Computer system/server 500 typically includes a variety of computer system readable media. Such media can be any available media that is accessible by computer system/server 500, and includes both volatile and non-volatile media and removable and non-removable media.

The system memory 504 can include computer system readable media in the form of volatile memory, such as random access memory (RAM) 508 and/or cache memory 510. Computer system/server 500 can further include other removable/non-removable, volatile/non-volatile computer system storage media (e.g., VCRs, DVRs, RAID arrays, USB hard drives, optical disk recorders, flash storage devices, and/or any other data processing and storage elements for storing and/or processing data). By way of example only, storage system 512 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 506 by one or more data media interfaces. As will be further depicted and described below, memory 504 can include at least one program product having a set (e.g., at least one) of program modules that are configured to carry out the functions of embodiments of the present invention.

The program/utility 516, having a set (at least one) of program modules, can be stored in memory 504 by way of example, and not limitation, as well as an operating system, one or more application programs, other program modules, and program data. Each of the operating system, one or more application programs, other program modules, and program data or some combination thereof, can include an implementation of a networking environment. Program modules 516 generally carry out the functions and/or methodologies of embodiments of the present invention as described herein.

The computer system/server 500 can also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 can communicate with one or more networks such as a local area network (LAN), a general wide area network (WAN), and/or a public network (e.g., the Internet) via network adapter 522. As depicted, network adapter 522 can communicate with the other components of computer system/server 500 via bus 506. It should be understood that although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

Additionally, the system 400 for enabling a root cause analysis for an error originating in a content management system can be attached to the bus system 506.

The present invention can be embodied as a system, a method, and/or a computer program product at any possible technical level of integration. The computer program product can include a computer readable storage medium (or media) or hardware storage device having computer readable program instructions thereon for causing a processor to carry out aspects of the present invention.

The computer readable storage medium or hardware storage device can be a tangible device that can retain and store instructions for use by an instruction execution device. The computer readable storage medium or hardware storage device can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium or hardware storage device includes the following: a semiconductor or solid state memory, a portable computer diskette, a hard disk, a random access memory (RAM), a read-only memory (ROM), an erasable programmable read-only memory (EPROM or Flash memory), a static random access memory (SRAM), a rigid magnetic disk, an optical disk, a portable compact disc read-only memory (CD-ROM), a compact disk-read/write memory (CR-RW), a digital versatile disk (DVD), a Blu-Ray disk, a memory stick, a floppy disk, magnetic tape, a mechanically encoded device such as punch-cards or raised structures in a groove having instructions recorded thereon, and any suitable combination of the foregoing. A computer readable storage medium or hardware storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or hardware storage device or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium or hardware storage device within the respective computing/processing device.

Computer readable program instructions for carrying out operations of embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++ or the like, and conventional procedural programming languages, such as the "C" programming language or similar programming languages. The computer readable program instructions can execute entirely on the user's computer, partly on the user's computer as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium or hardware storage device that can direct a computer, a programmable data processing apparatus, and/or other devices to function in a particular manner, such that the computer readable storage medium or hardware storage device having instructions stored therein includes an article of manufacture including instructions which implement aspects of the function/act specified in the flowchart and/or block diagram block or blocks.

The computer readable program instructions can also be loaded onto a computer, other programmable data processing apparatus, or another device to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit embodiments of the present invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, the terminology and embodiments used herein were chosen in order to best explain the principles of the present invention, the practical applications and technical improvements over technologies found in the art, and to enable others of ordinary skills in the art to understand the present invention through various embodiments with various modifications, as are suited to the particular uses contemplated.

The descriptions of the various embodiments of the present invention have been presented for purposes of illustration, but are not intended to be exhaustive or limited to the embodiments disclosed. The corresponding structures, materials, acts, and equivalents of all elements in the claims below are intended to include any structure, material, or act for performing the functions of embodiments of the present invention in combination with other claimed elements, as specifically claimed. The above description of embodiments of the present invention has been presented for the purposes of illustration and description, but is not intended to be exhaustive or limited to the embodiments of the present invention in the form disclosed. Many modifications and variations will be apparent to those of ordinary skills in the art without departing from the scope and spirit of the present invention.

What is claimed is:

1. A computer-implemented method for enabling a root cause analysis for an error originating in a content management system, the content management system being adapted for a creation and a change of a plurality of digital content items, the method comprising:
    storing in the content management system an identifier and a version number for a digital content item undergoing a change associated with the digital content item;
    rendering a web page comprising the digital content item, wherein the identifier and the version number are invisibly included in the web page;
    including the identifier and the version number in a request based on the rendered web page comprising the digital content item;
    storing fingerprint data associated with the request;
    creating an error record in the case that during an execution of the request an execution error occurs, wherein the error record comprises the identifier, the version number of the digital content item, and the related fingerprint data;
    making the error record, the identifier, the version number of the related digital content item, and the related fingerprint data, available to a browser;
    determining a common subset of attribute values of the error record and earlier stored error records; and
    relating the error record to earlier stored error records in the case that a predefined number of attribute values are identical between the error record and the earlier stored error records.

2. The method according to claim 1, wherein the fingerprint data comprises at least one selected from the group consisting of: the content identifier, the content version number, a web page identifier, a web page version number, the type of request, a selected dialog language, a locale, a user identifier, a role associated with the user identifier, and a permission associated with the user identifier.

3. The method according to claim 1, further comprising passing on the fingerprint data of the request to services receiving sub-requests of the request.

4. The method according to claim 1, further comprising sending an alert to a developer account relating to the digital content item having caused the creating of the error record.

5. The method according to claim 1, wherein making the error record available comprises making the identifier, the version number of the digital content item, and the fingerprint data of the earlier stored error records available.

6. The method according to claim 1, further comprising:
    deactivating the digital content item, having caused the creation of the error records; and
    activating another digital content item having the same identifier and an earlier version number.

7. The method according to claim 1, further comprising:
    generating hypothetical fingerprint data for another digital content item undergoing a current change;
    comparing the hypothetical fingerprint data with a database of fingerprint data associated with error records; and
    generating a warning message for the current change if a predefined number of attribute values of the hypothetical fingerprint data and one of the fingerprint data of the database match.

8. The method according to claim 7, further comprising:
    comparing the hypothetical fingerprint data of the current change with fingerprint data of error records by calculating a distance vector or performing a cognitive classification for attribute values of each hypothetical fingerprint data set and fingerprint data from the error records resulting in a comparison result; and
    making the comparison result available for review.

9. The method according to claim 8, further comprising deriving rules based on the distance vector or the cognitive classification of comparing earlier error records.

10. A system for enabling a root cause analysis for an error originating in a content management system, the content management system being adapted for a creation and a change of a plurality of digital content items, the system comprising:
    a memory medium comprising program instructions;
    a bus coupled to the memory medium; and
    a processor, for executing the program instructions, that when executing the program instructions causes the system to:
    store an identifier and a version number for a digital content item undergoing a change associated with the digital content item;
    render a web page comprising the digital content item, wherein the identifier and the version number are invisibly included in the web page;
    include the identifier and the version number in a request based on the rendered web page comprising the digital content item;
    store fingerprint data associated with the request;
    create an error record in the case that during an execution of the request an execution error occurs, wherein the error record comprises the identifier, the version number of the digital content item, and the related fingerprint data;
    make available the error record, the identifier, the version number of the related digital content item, and the related fingerprint data, to a browser;
    determine a common subset of attribute values of the error record and earlier stored error records; and
    relate the error record to earlier stored error records in the case that a predefined number of attribute values are identical between the error record and the earlier stored error records.

11. The system according to claim 10, wherein the fingerprint data comprises at least one selected from the group consisting of: the content identifier, the content version number, a web page identifier, a web page version number, the type of request, a selected dialog language, a locale, a user identifier, a role associated with the user identifier, and a permission associated with the user identifier.

12. The system according to claim 10, the instructions further causing the system to pass on the fingerprint data of the request to services receiving sub-requests of the request.

13. The system according to claim 10, the instructions further causing the system to send an alert to a developer account, relating to the digital content item, having caused the creating of the error record.

14. The system according to claim 10, the instructions further causing the system to make available the identifier, the version number of the digital content item, and the fingerprint data available of the earlier stored error records.

15. The system according to claim 10, the instructions further causing the system to;
  deactivate the digital content item having caused the creation of the error records; and
  activate another digital content item having the same identifier and an earlier version number.

16. The system according to claim 10, the instructions further causing the system to:
  generate hypothetical fingerprint data for another digital content item undergoing a current change;
  compare the hypothetical fingerprint data with a database of fingerprint data associated with error records; and
  generate a warning message for the current change if a predefined number of attribute values of the hypothetical fingerprint data and one of the fingerprint data of the database match.

17. The system according to claim 16, the instructions further causing the system to:
  compare the hypothetical fingerprint data of the current change with fingerprint data of error records by calculating a distance vector or performing a cognitive classification for attribute values of each hypothetical fingerprint data set and fingerprint data from the error records, resulting in a comparison result;
  make the comparison result available for review; and
  derive rules based on the distance vector or the cognitive classification of comparing earlier errors.

18. A computer program product for enabling a root cause analysis for an error originating in a content management system, the content management system being adapted for a creation and a change of a plurality of digital content items, the computer program product, comprising a computer readable hardware storage device having program instructions embodied therewith, the program instructions being executable by one or more computing systems to cause the one or more computing systems to:
  store an identifier and a version number for a digital content item undergoing a change associated with the digital content item;
  render a web page comprising the digital content item, wherein the identifier and the version number are invisible included in the web page, wherein an analysis script is included in the web page;
  include, by the analysis script, the identifier and the version number in a request based on the rendered web page comprising the digital content item;
  store fingerprint data associated with the request;
  create an error record in the case that during an execution of the request an execution error occurs, wherein the error record comprises the identifier, the version number of the digital content item, and the related fingerprint data;
  make available the error record, the identifier, the version number of the related digital content item, and the related fingerprint data, to a browser;
  determine a common subset of attribute values of the error record and earlier stored error records; and
  relate the error record to earlier stored error records in the case that a predefined number of attribute values are identical between the error record and the earlier stored error records.

19. The computer program product according to claim 18, the program instructions further causing the one or more computing systems to send an alert to a developer account relating to the digital content item having caused the creating of the error record.

20. The computer program product according to claim 18, wherein making the error record available comprises making the identifier, the version number of the digital content item, and the fingerprint data of the earlier stored error records available.

* * * * *